United States Patent [19]
Hamashige

[11] 3,784,974
[45] Jan. 8, 1974

[54] DRIVER'S COMMUNICATING SIGNAL LIGHTS FOR ACCELERATING, BRAKING AND TURNING OPERATIONS

[76] Inventor: Carl H. Hamashige, 1445½ Lime Ave., Long Beach, Calif. 90813

[22] Filed: May 14, 1971

[21] Appl. No.: 143,432

[52] U.S. Cl. .................. 340/67, 340/73, 340/81 F, 340/87
[51] Int. Cl. ............................................. B60q 1/38
[58] Field of Search ................ 340/66, 67, 73, 74, 340/81 R, 81 F, 84, 87, 89

[56] References Cited
UNITED STATES PATENTS

| | | | |
|---|---|---|---|
| 2,001,705 | 5/1935 | Caponi | 340/67 X |
| 2,399,057 | 4/1946 | Partridge | 340/119 |
| 2,843,836 | 7/1958 | McDonald | 340/87 |
| 3,375,365 | 3/1968 | Cross | 240/7.1 R |
| 3,439,326 | 4/1969 | Boudin | 340/87 |
| 3,487,359 | 12/1969 | McClintock | 340/87 |
| 3,614,733 | 10/1971 | Halligan | 340/87 |

FOREIGN PATENTS OR APPLICATIONS

| | | | |
|---|---|---|---|
| 629,869 | 8/1927 | France | 340/87 |

*Primary Examiner*—Kenneth N. Leimer
*Attorney*—William C. Babcock

[57] ABSTRACT

An electrically operated communicating signal light assembly that is mounted on an automotive vehicle, and is automatically actuated to visually indicate from either the rear, front or side thereof that the vehicle is being accelerated, braked or turned, and if turning whether the same is at a steady or accelerated rate of speed.

4 Claims, 9 Drawing Figures

PATENTED JAN 8 1974

INVENTOR.
CARL H. HAMASHIGE
BY
William G. Babcock
ATTORNEY

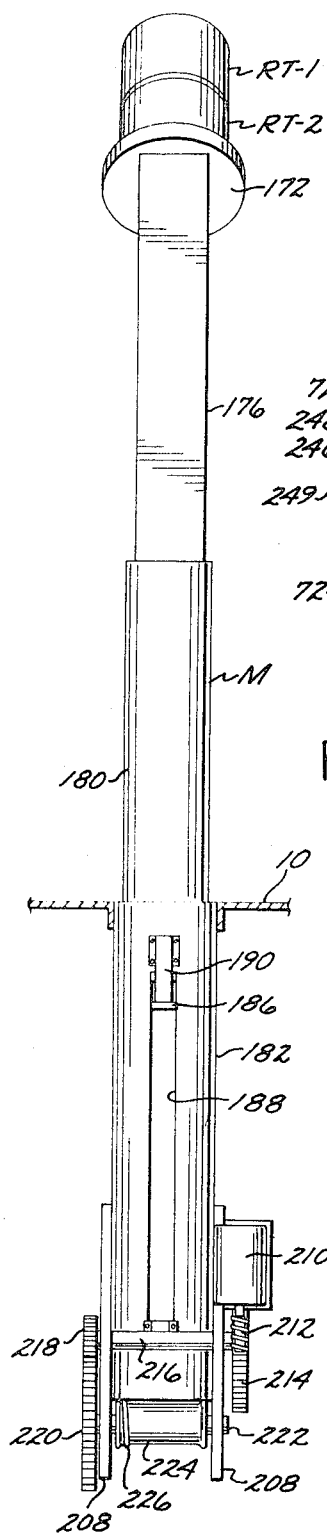
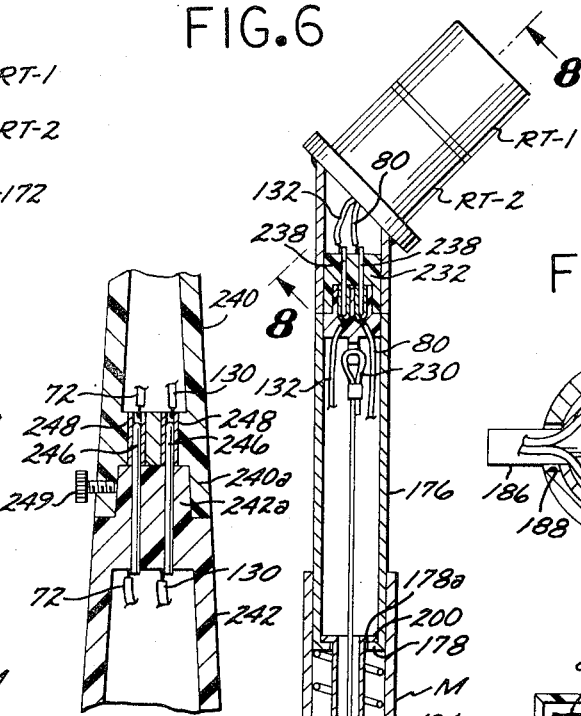
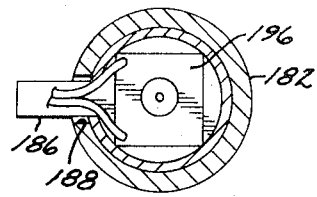

DRIVER'S COMMUNICATING SIGNAL LIGHTS FOR ACCELERATING, BRAKING AND TURNING OPERATIONS

BACKGROUND OF THE INVENTION

1. Field of the Invention

Driver's communicating signal lights for accelerating, braking and turning operations.

2. Description of the Prior Art

The primary purpose of this invention is to provide a means of visual communication from driver to driver and from driver to pedestrian under all conditions on the freeways, highways, roads, streets and intersections.

This will be accomplished through the use of colored signal lights, representing the three essential operations, accelerating (green lights), braking (red lights) and turning (blinking light). There will be three pair of signal lights located on the front, rear and on the top of the vehicle. The top communicating signal lights are elevated above the vehicle top in order to be visible to as many drivers as possible in all directions, front, rear and sides of the vehicle. With this system, it will be possible for the driver to communicate with all the other drivers and pedestrians.

Once full communication is established it would create a safer condition or situation for all drivers and pedestrians alike.

The present day vehicle communicating signal lights are inadequate. Of the three essential operations only two are represented. The braking operation has only one pair of lights on the rear, visible usually only to one driver in the rear. The turning operation is a little better. It has one pair of lights on the rear and one pair of lights on the front. The rear lights are visible usually to only one driver in the rear. The front lights are visible to many oncoming vehicles, since the drivers will be viewing it from a slight angle. The accelerating operation, which is of primary importance is totally absent. It is this operation that moves a vehicle from a standstill to a dangerous high speed. Only when this operation sets the vehicle in motion is it possible to use the other two devices, to turn or to stop.

The lack of the accelerating signal lights are the cause of many accidents, from rear-end crashes to head-on crashes at intersections.

The driver operates an automobile on only three essential devices, the accelerator to move or set in motion, the brake to slow down or to come to a complete stop, and the steering wheel to turn in any direction. The operations of these three devices are of vital importance and should be instantly communicated to all drivers and pedestrians. This could be accomplished through the use of colored lights; the green lights to represent the accelerating operation; the red lights to represent the braking operation; and the blinking lights to represent the turning operation. The blinking lights would be either red or green, whichever device (accelerator or brake) is used in the turning operation. These are all the signal lights that are absolutely necessary. There will be no amber lights or any other colored lights that are non-essential and do not represent any operational devices.

The communicating signal lights will consist of six lights on three locations. Each signal light will be in two parts, the top half red and the bottom half green. The first two signal lights will be located on the front corners of the vehicle as to be visible from the front and the right and left sides of the front. The second two signal lights will be on the rear corners of the vehicle. They will be visible from the rear and the right and left sides of the rear. The third pair of signal lights are elevated and situated above the top rear portion of the vehicle. The third pair of signal lights are visible 360 degrees, or in all directions, and when energized serve to indicate a change in the direction and rate of movement of the vehicle on which they are mounted. Since the elevated top signal lights will be visible in all directions, it would seem unnecessary to have front and rear signal lights. However it will be essential under several situations, such as when emerging (forward or rearward) from a blind corner, alley, building or from behind a truck. Then the front or rear signal lights will be visible to the approaching vehicles, warning of its operations. Another situation would be whenever the top signal lights are defective and are not working, or the whole signal light assembly is damaged. The front signal lights and the rear signal lights will assist and relay the signal to the vehicle in the immediate rear, whose top signal lights would relay signals rearward down the line of vehicles.

The front communicating signal lights including the top signal lights are most useful especially at intersections. With this system all drivers approaching the intersection would be communicating with each other. There would be less confusion and hesitation, creating safer and faster traffic at the intersections. Also the pedestrian at the crosswalk would benefit by this system; they would be informed instantly whether it is safe or not to cross the street.

The headlights and the taillights will be the only other lights besides the communicating signal lights, and will be used during night driving. The taillights will be of dark amber color warning lights and nothing more. This will be less confusing and safer then the existing system of all red taillights, stoplights, and turn lights.

The emergency lights (flashing red lights) are included in the communicating signal lights system. The hand operated switch will be on the dashboard.

This communicating signal lights system is adaptable for use on trucks, buses, and trailers.

The primary purpose in devising the present invention is to provide a communicating signal light assembly that is automatically actuated to indicate when the vehicle on which it is mounted is being braked, accelerated, or is initiating a turn, and these signals being visible to drivers in vehicles that are separated from the vehicle on which the inventions is mounted by one or more cars.

SUMMARY OF THE INVENTION

An automotive communicating signal assembly that includes a pair of laterally spaced masts mounted on the rear of the vehicle, and each mast supporting a green and red light emitting device. Pairs of green and red electrically operated lights are situated on the rear of the vehicle, and on each side thereof, and like pairs of red and green lights are situated on the forward portion of the vehicle. The masts are vertically adjustable as to height, to permit the red and green lights supported thereon to be at an elevation that is visible to drivers in a sequence of cars 360° or in all directions of the vehicle on which the masts are mounted.

A major object of the present invention is to supply an automotive communicating signal assembly that will indicate whether the vehicle on which it is mounted is being braked and slowed down, is being accelerated, or is initiating a turn, and with such signals being visible to a sequence of cars situated rearwardly of the vehicle on which the assembly is installed.

Another object of the invention is to supply an automotive communicating signal assembly that is automatically actuated, and will minimize accidents in driving by visually indicating to a sequence of automobiles rearwardly of the vehicle on which the device is mounted, as to whether the latter is accelerating, braking or initiating a turn.

Another object of the invention is to supply an automotive signalling device in which portions thereof may be elevated for maximum safety during driving, but with the elevated signal lights capable of being lowered or removed to the extent that the vehicle on which they are mounted may be guided through a passageway into a car wash without damage being done to the signal lights.

A further object of the invention is to supply a communicating signal assembly for a vehicle in which a number of green lamps are illuminated when the vehicle is traveling at a uniform speed or accelerating, and said assembly including a number of red lamps that are illuminated when the vehicle is being braked or making a turn. When the vehicle in making a turn the green or red lamps are flashed on and off to indicate the duration of the turn and whether the turn is being made without braking.

BRIEF DESCRIPTION OF THE DRAWINGS

FIG. 5 is a side elevational view of one of the mast supported signal assemblies taken on the line 5—5 of FIG. 1;

FIG. 6 is a longitudinal cross sectional view of the mast and signal lamps;

FIG. 7 is a transverse cross sectional view of one of the masts taken on the line 7—7 of FIG. 6;

FIG. 8 is a fragmentary longitudinal cross sectional view of one of the mast supported signal lamps taken on the line 8—8 of FIG. 6; and FIG. 9 is a longitudinal cross sectional view of the second form of mast shown in FIG. 2, which could be separated by unscrewing the lock screw.

DESCRIPTION OF THE PREFERRED EMBODIMENTS

Figure 1:
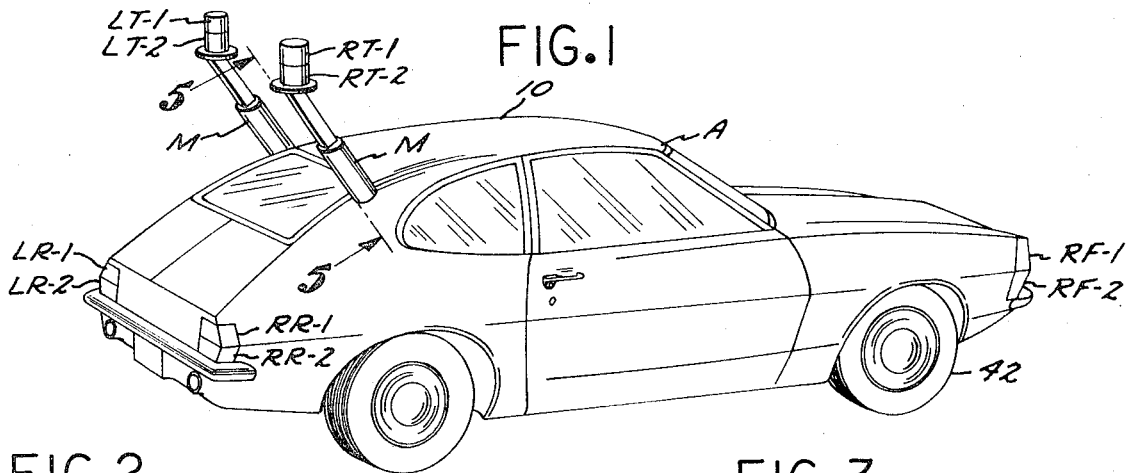
FIG. 1 is a perspective view of a vehicle on which the automotive communicating signal assembly is installed, with a portion of the signal lights being disposed at their maximum elevation.
Figure 2:
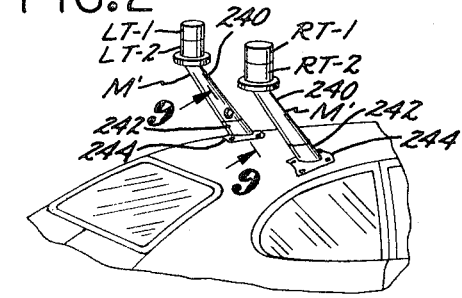
FIG. 2 is a fragmentary perspective view of a rear portion of the vehicle shown in FIG. 1 with second forms of lamp supporting masts, a fixed stationary type, which could be removed.

The communicating signal assembly as may best be seen in FIG. 1 is mounted on a vehicle A and preferably includes two identical laterally spaced masts M. The masts M are situated at the rear of the vehicle A, and preferably from the top 10 thereof if the vehicle is of a sedan type structure.

Figure 4:
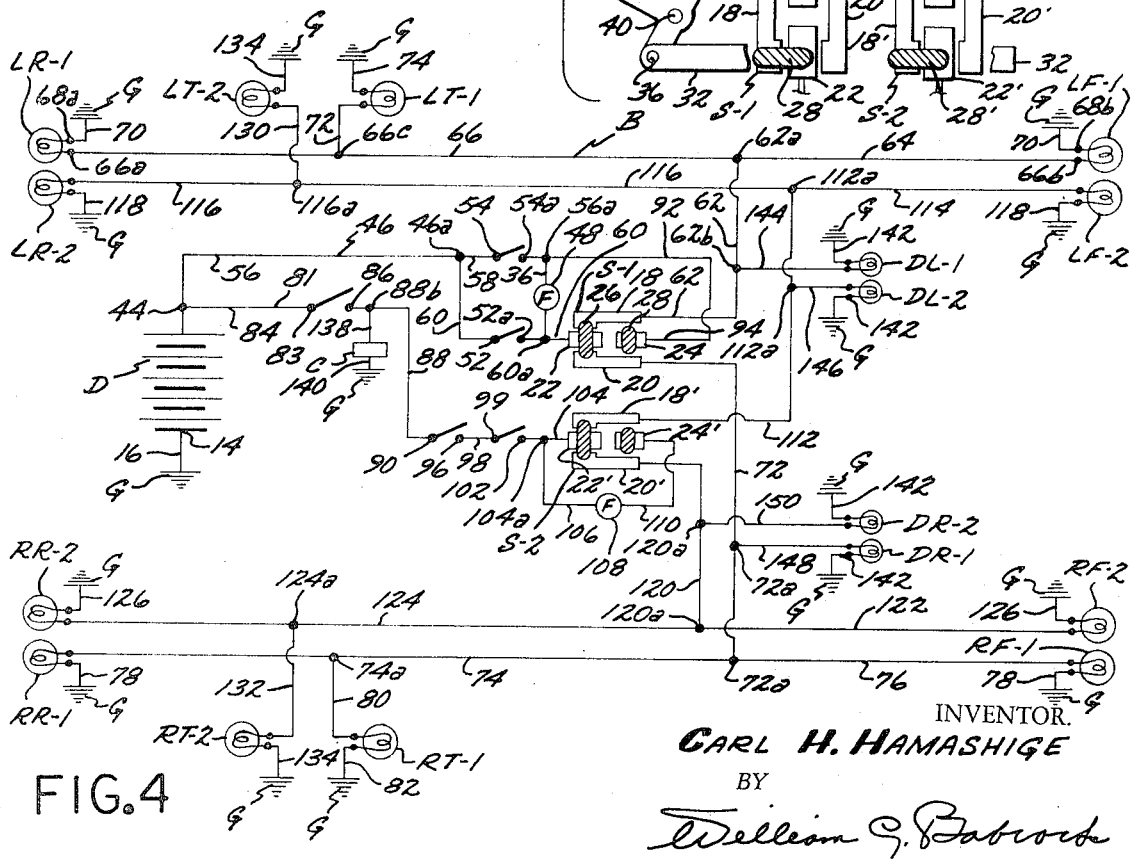
FIG. 4 is a diagrammatic view of the inventions and the electrical wiring, switches, and components used therewith.

The signal assembly includes two electrically illuminatable red lamps LR-1 and RR-1 at the rear thereof, and two similar red lamps LF-1 and RF-1 at the front of the vehicle as shown in FIGS. 1 and 4. The signal assembly A also includes two green illuminatable lamps LR-2 and RR-2 at the rear of the vehicle as well as LF-2 and RF-2 at the front thereof. The green and red lamps above identified are preferably adjacently disposed to one another, but separated from one another by an opaque material later to be described, to prevent concurrent illumination of both lamps when but one is electrically energized.

The two masts M as may best be seen in FIG. 6 are vertically adjustable, and support on their upper ends illuminatable red lights LT-1 and RT-1, and green illuminatable lamps LT-2 and RT-2 therebelow. An electric circuit B is shown in FIG. 4 that will later be described in detail that so energizes the lights above described that when the vehicle A is being driven and traveling in a straight direction, the green lights LR-2, RR-2, RF-2, LF-2, LT-2 and RT-2 will be illuminated to indicate that the vehicle A is being driven at a constant speed or is accelerating. If the vehicle A initiates a turn to the left, the lights LR-2, LF-2 and LT-2 will be caused to flash green, and if to the right, the green lights, RR-2, RF-2 and RT-2 will be caused to operate similarly.

When the vehicle A is braked and the vehicle is traveling forwardly in a straight line, the red lamps LR-1, RR-1, LF-1, RF-1, LT-1 and RT-1 will be illuminated to so indicate. However, if the vehicle is being braked, and concurrently is initiating a turn to the left, the red lamps LR-1, LF-1 and LT-1 will be caused to flash to indicate such a turn is imminent. Likewise, if the vehicle is initiating a turn to the right, the red lamps RR-1, RF-1 and RT-1 will be caused to flash to indicate the initiation of such a turn.

The vehicle A is powered by an internal combustion engine (not shown) that has an ignition system C associated therewith as best seen in FIG. 4. The vehicle A as is conventional with such devices has an accelerator pedal, transmission, and brake (not shown) that are of conventional nature. Electrical energy for the vehicle A as may best be seen in FIG. 4 is supplied by a suitable battery D that has a first terminal 14 connected by an electrical conductor 16 to the ground G.

Figure 3:
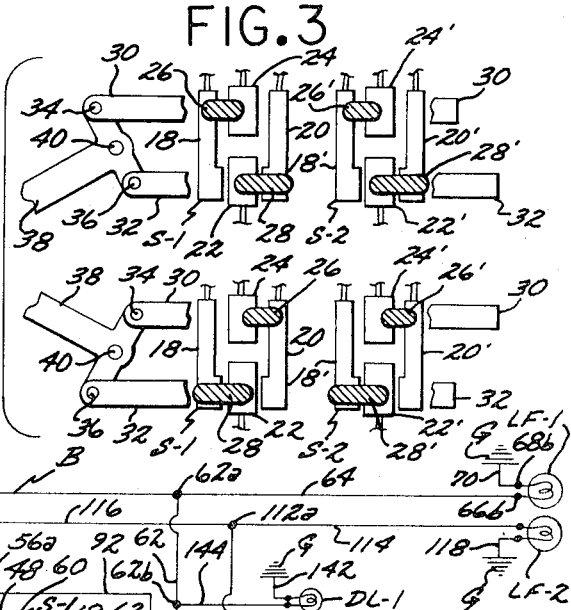
FIG. 3 is a diagrammatic view of turn switch assemblies used in conjunction with the invention.

Two turn switches S-1 and S-2 are shown in FIGS. 3 and 4. The switches S-1 and S-2 are shown in first positions in FIG. 4, in second positions in the upper portion of FIG. 3, and in third positions in the lower portion of FIG. 3. The switches S-1 and S-2 are in the first position when the vehicle is being driven in a straight line, and in the second position when the vehicle is initiating a left turn. The switches S-1 and S-2 occupy the third positions when the vehicle A is starting to make a right turn. The switches S-1 and S-2 are of similar structure.

The switch S-1 includes first, second, third and fourth spaced electrical conducting plates 18, 20, 22 and 24 that are mounted in fixed positions on an insulated backing plate (not shown). A switch S-2 likewise has first, second, third and fourth spaced electrical conducting plates 18', 20', 22' and 24'. The switch S-1 has two elongate contacts 26 and 28 associated therewith that occupy the first position shown in FIG. 4 when the vehicle A is traveling in a straight line, the second position shown in the upper portion of FIG. 3 when the vehicle is turning to the left, and the third position shown in the lower portion of FIG. 3 when the vehicle is turning to the right. Shifting of the contacts 26 and 28 to the three positions is accomplished by the contacts being secured to two parallel levers 30 and 32 that are formed of an electrical insulating material. The levers 30 and 32 are by pins 34 and 36 pivotally connected to a T-shaped member 38 that pivots on a pin 40 when the front wheels 42 of the vehicle A are turned. The connection of the T-shaped member 38 to be actuated by turning movement of the wheels 42 as the vehicle A is steered is conventional and is not shown. Switch S-2 also has contacts 26' and 28' associated therewith that are also connected to the levers 30 and 32, and are moved concurrently with the contacts 26 and 28. The positions of the contacts 26' and 28' relative to the plates 18', 20', 22' and 24' as the contacts 26 and 28 are shifted, are shown in detail in FIGS. 3 and 4.

A second terminal 44 of the battery D is connected to a first electrical circuit 46 that includes a first flasher 48 on FIG. 4, a first switch 52 that is normally open, but is closed when the brake (not shown) on the vehicle is actuated, and a second normally open switch 54 that is closed manually when it is desired to actuate the emergency flasher lights. First circuit 46 includes a conductor 56 that extends from the second terminal 44 to a junction point 46a. The junction point 46a is connected by conductor 58 to second switch 54 and by conductor 60 to first switch 52. A contact 54a of second switch 54 is connected by a conductor 56 to one terminal of first flasher 48, and the other terminal of the flasher is connected by a conductor 58 to a junction point 60a that is located in a conductor 60 that extends between second plate 22 of first turning switch S-1 and contact 522 of first switch 52. First plate 18 of first switch S-1 is connected by a conductor 62 to a junction point 62a and from which junction point conductor 64 and 66 extend to first terminals 66a and 66b of lamps LR-1 and LF-1. The second terminals 68a and 68b of lamps LR-1 and LF-1 are connected by conductors 70 to ground G. Conductor 66 has a junction point 66c therein from which a conductor 72 extends to one terminal of a lamp LT-1, with the other terminal of the lamp being connected by a conductor 74 to ground G. The second plate 20 is connected by a conductor 72 to a junction point 76a from which two conductors 74 and 76 extend to terminals of the lamps RR-1 and RF-1, with the other terminals of the lamps being connected by conductors 78 to ground G. Conductor 74 has a junction point 74a therein from which a conductor 80 extends to one terminal of the lamp RT-1, with the other terminal of the lamp being connected by a conductor 82 to ground G. Conductor 56 has a junction point 56a therein from which a conductor 92 extends to the plate 24.

Second electrical circuit 81 extends from the second terminal 44 to the second turn switch 18' as may best be seen in FIG. 4. The second circuit 81 includes a third switch 83 that is preferably placed in the closed position by an ignition key (not shown). The switch 83 is connected to junction point 44 by a conductor 84. A contact 86 of switch 83 has an electrical conductor 88 extending therefrom to a fourth switch 90 that is placed in a closed position when the accelerator pedal (not shown) of the vehicle A is depressed.

Terminal contact 96 of switch 90 is connected by a conductor 98 to a fifth switch 99 that is placed in the closed position when the transmission (not shown) of the vehicle is actuated. Contact 102 of switch 99 has a conductor 104 extending therefrom to third plate 22' of second turn switch S-2. A junction point 104a in conductor 104 is connected by a conductor 106 to one terminal of a third flasher 108, with the other terminal of the flasher being connected by a conductor 110 to the front plate 24' of second turn switch S-2. First plate 18' of turn switch S-2 is connected by a conductor 112 to a junction point 112a from which conductors 114 and 116 extend to terminals of the lamps LR-2 and LF-2, with the other terminals of these two lamps being connected to the ground G by conductors 118 as shown in FIG. 4.

The second plate 20' of second turn switch S-2 is connected by a conductor 120 to a junction point 120a from which two conductors 122 and 124 extend to terminals of the lamps RR-2 and RF-2, with the other terminals of there two lamps being connected to the ground G by conductors 126. Conductors 116 and 124 have junction points 116a and 124a therein from which conductors 130 and 132 extend to terminals of the lamps LT-2 and RT-2. The other terminals of the lamps LT-2 and RT-2 are connected by conductors 134 to ground G. Conductor 88 as may best be seen in FIG. 4 has a junction point 88b therein from which a conductor 138 extends to the ignition system C, with the other terminal of the ignition system being connected to the ground G by a conductor 140.

Four dash lamps to indicate operation of the system are provided, which in FIG. 4 are identified as DL-1, DL-2, DR-1 and DR-2. The four dash lamps above described are connected to ground G by conductors 142. The other terminal of lamp DL-1 is connected by a conductor 144 to a junction point 62b as shown in FIG. 4. Lamp DL-2 has one terminal connected by a conductor 146 to a junction point 112a. Lamp DR-1 has one terminal thereof connected by a conductor 148 to junction point 72a. One terminal of the light DR-2 is connected by a conductor 150 to a junction point 120a as shown in FIG. 4.

The lamps RT-1 and RT-2 are shown in structural detail in FIGS. 6 to 8 inclusive. Lamps LT-1 and LT-2 are of the same structure as lamps RT-1 and RT-2. The illuminatable portion of the lamp RT-1 is defined by an inverted cup of red transparent or translucent material 152 that is connected by conventional means 154 such as a ring or the like to a cylindrical shell 156 of a green translucent or transparent rigid material. The shell 156 on its lower ends develops into a ring-shaped flange 158 that is secured to a circular rigid base 160.

The base 160 serves as a support for a bracket 162 that is situated inside the cup 152 and shell 156, and the bracket supporting two sockets 164 and 166 in which incandescent bulbs 164a and 166a are mounted. The bulbs 164a and 166a are separated from one another by an opaque reflector 168 of curved configuration that is secured to the bracket 162 by screws 170 or other suitable fastening means.

The base 160 is secured to a plate 172 that is affixed to a first tubular section 174 of one of the masts M. The first section 176 has a circular flange 178 that extends inwardly from the lower end thereof. A second tubular section 180 is longitudinally movable in a substantially vertical housing 182 that is secured to the top 10 by conventional means 184. The second section 180 includes a transverse bottom cross member 186 that projects outwardly from a vertically extending slot 188 formed in the housing. The member 186 on the portion thereof exteriorly of the housing 182 has an upright 190 mounted thereon that supports a spring loaded switch 192. A first compressed helical spring 194 is situated inside the second section 180 and has the upper end thereof in pressure contact with the flange 178 and the lower end in contact with a second flange 196 that projects inwardly from the lower end of the second section 180.

A tubular member 198 has an exteriorly extending flange 200 on the upper end thereof that rests on the first flange 178. The tubular member 198 has a switch engaging member 202 projecting outwardly therefrom as shown in FIG. 6.

The housing 182 has a bottom 204 that is engaged by the lower end of a compressed second helical spring 206, which has the upper end thereof bearing against the member 186. The springs 194 and 206 at all times tend to expand and maintain the mast M in the extended position shown in FIG. 6. Two vertically extending plates 208 are secured to the lower portion of the housing 182. One of the plates 208 serves as a mounting for a reversible electric motor 210 that drives a worm gear 212 that is in engagement with a gear wheel 214. The gear wheel 214 is secured to a shaft 216 journalled in plates 208, and which shaft has a second gear wheel 218 mounted thereon. The second gear wheel engages a third gear wheel 220 that is secured to a shaft 222 that supports a reel 224 on which a cord or cable 226 is wound as shown in FIG. 5. The cable 226 extends over an idling roller 228 as shown in FIG. 6 and extends up through an opening 204a in member 204 as well as an opening 186a in member 186 and through the tubular member 198 to terminate in a loop 230 that is in turn secured to a plug assembly 232 that forms a part of the first section 176.

Spring 194 requires a substantial less downwardly directed force to compress than does spring 206. When electric motor 210 is energized to wind cord 226 on reel 224, first section 176 is moved downwardly in second section 180. Upon plug 232 contacting flange 200, tube 198 and member 202 are moved longitudinally for switch 192 to move from a first to a second position. Member 202 now contacts 186, and spring 206 is compressed as the first and second sections 176 and 180 move downwardly into housing 182. A spring loaded switch 234 is mounted on the exterior of housing 182 and vertically aligned with switch 192. Switches 192 and 234 may be included as a part of an electric circuit (not shown) that powers notor 210. When the motor 210 has been energized in a direction to allow springs 194 and 206 to move the mast sections to the position shown in FIG. 6, member 202 contacts switch 192 to change the position thereof and break the electric circuit (not shown) to motor 210. The circuit (not shown) to motor 210 is broken when member 186 moves downwardly to contact switch 234.

The first section 176 and plug 232 are preferably formed as two parts that removably interlock as shown in FIG. 6 to permit separation thereof for maintenance purposes. Conductors 80 and 132 pass through plug 232 and are removably connected by bayonets 238 and sockets 240.

The masts M' are similar in appearance to the masts M, but include only first and second tubular elongate sections 240 and 242 that removably interlock together at portions 240a and 242a thereof as shown in FIG. 9. Second sections 242 are secured to top 10 by flange 244. Conductors 72 and 130 extend through portions 240a and 242a and are connected by bayonets 246 and sockets 248. A thumb screw 249 serves to removably lock sections 240 and 242 together.

In operation the third switch 82 is closed which energizes the ignition system C from the battery D. When the accelerator pedal (not shown) is depressed, the fourth switch 90 is closed as is the fifth switch 99 when the transmission (not shown) is actuated. When the vehicle is being driven day or night and the above mentioned switch is closed, the green lights LR-2, LT-2, LF-2, RR-2, RT-2 and RF-2 will be illuminated to indicate that the vehicle is being driven at a constant speed or is accelerating. However, upon the first switch 52 being closed by actuation of the brake (not shown), the red lamps LR-1, LT-1, LF-1, RR-1, RT-1, and RF-1 are illuminated so long as the brake pedal remains depressed. The above mentioned red lamps remain illuminated so long as the first turning switch S-1 occupies the first position as shown in FIG. 4.

Upon the vehicle A being turned to the left, the switches S-1 and S-2 occupy the second position shown in the upper portion of FIG. 3, with the circuit to the red lamps LR-1, LT-1 and LF-1 including the flasher 48. These three lamps are flashed to indicate the vehicle A is initiating a left turn. When the vehicle A initiates a right turn, the switches S-1 and S-2 occupy the third position shown in the lower portion of FIG. 3, with the flasher 48 then causing the red lamps RR-1, RT-1 and RF-1 to flash to indicate that the vehicle is initiating a turn to the right. If the vehicle A turns to the right or the left with the accelerator pedal depressed, the switch S-2 as it moves to second and third positions places the flasher 108 in the circuit, for the appropriate green lamps to flash and indicate that the turn is being made at a constant or accelerated speed without the foot of the driver being completely removed from the accelerator pedal (not shown).

The lamps DL-1, DL-2, DR-1 and DR-2 are on the dash of the vehicle and are colored red and green to indicate which of the exteriorly positioned lamps on the vehicle are being actuated. When the vehicle is being driven day or night, the electric motor 210 by conductors (not shown) that extend to the battery D is electrically energized by suitable switching means (not shown), and the motor when driven in a first direction in which the cable or cord 226 is wound on the reel 224 lowering the masts M. When the electric motor is reversed, the masts may be disposed in the extended position due to the action of the springs 194 and 206 which at all times tend to move the masts to the position shown in FIG. 6.

The alternate form of the mast M' is lowered by actually removing the first section 240 and the lamps supported thereby from the second section 242.

I claim:

1. A communicating assembly mountable upon an internal combustion engine-powered automotive vehicle having a source of electric energy that has first and second terminals, with said first terminal being connected to a ground, and said vehicle including an ignition system, accelerator pedal, transmission, and brake pedal, said assembly including:

a. a pair of laterally spaced masts that extend upwardly from said vehicle;

b. first and second pairs of electrically operated red and green lamps mounted on the left and right rear portions of said vehicle;

c. third and fourth pairs of electrically operated red and green lamps mounted on the left and right front portions of said vehicle;

d. fifth and sixth pairs of electrically operated red and green lamps mounted on the upper ends of said masts;

e. first and second turn switch assemblies on said vehicle that each occupy first positions when said vehicle is traveling straight, with said first and second switch assemblies occupying second positions when said vehicle is turning to the left, and said first and second switch assemblies occupying third positions when said vehicle is turning to the right;

f. a first electric circuit assembly that is so connected to said second terminal and said first turn switch assembly and said red lamps of said first, second, third, fourth, fifth and sixth pairs that when said first turn switch assembly is in said first position and a first normally open electric switch that forms a part of said first circuit assembly is closed by actuation of said brake pedal said red lamps are illuminated with a steady light, with said first circuit assembly including a first flasher and a second normally open manually operated emergency switch, with said flasher when said first turn switch assembly is moved to a second position and said first switch is closed by actuation of said brake pedal causing said first, third and fifth red lamps to flash to indicate said vehicle is turning to the left at a decreasing rate, and said first turn switch assembly when moved to a third position and said first switch is closed causing said second, fourth and sixth red lamps to flash to indicate said vehicle is turning to the right at a decreasing rate.

g. a second electric circuit assembly that is so connected to said second terminal and said second turn switch assembly and said green lamps of said first, second, third, fourth, fifth and sixth pairs that when said second turn assembly is in said first position and third, fourth and fifth electric switches that form a part of said second electric circuit assembly are closed said green lamps in said pairs are illuminated and said ignition is energized to actuate said engine to move said vehicle, said third switch being closed by an ignition key, said fourth switch being closed by downward movement of said accelerator pedal, and said fifth switch being closed by actuation of said transmission, with said third, fourth and fifth switches when closed and said second turn switch assembly moved to said second position cooperating with a second flasher that forms a part of said second circuit assembly to flash said first, third and fifth green lamps to indicate a left turn is being made by said vehicle at an accelerated rate, and said second flasher when said second turn assembly is in said third position causing said second, fourth and sixth green lamps to flash to indicate that a right turn is being made by said vehicle at an accelerated rate.

2. A communicating signal assembly as defined in claim 1 in which each of said masts includes a plurality of telescopically joined tubular sections, and in addition:

h. power means for moving said sections relative to one another to raise and lower said lamps supported thereon.

3. A communicating signal assembly as defined in claim 2 in which said power means includes at least one spring that at all times tends to move said sections to dispose said lamps at maximum elevations and at least one electric motor that when energized so moves said sections that they telescope into one another to dispose said lamps supported on said sections at minimum elevations.

4. A communicating signal assembly as defined in claim 1 in which said masts are defined by a plurality of sections that removably interlock with one another.

* * * * *